United States Patent [19]
Sanner et al.

[11] 3,978,450
[45] Aug. 31, 1976

[54] IMAGE CHARACTER READER SYSTEM

[75] Inventors: Medford Duane Sanner, Irving, Tex.; Jim O. Lafevers, Richardson, Tex.; Sauas Mirci, Mission Viejo, Calif.

[73] Assignee: Recognition Equipment Incorporated, Irving, Tex.

[22] Filed: May 30, 1974

[21] Appl. No.: 474,383

[52] U.S. Cl. ............... 340/146.3 C; 235/61.11 D; 360/122
[51] Int. Cl.² ............................................ G06K 9/12
[58] Field of Search ............ 340/146.3 C, 146.3 D, 340/146.3 AG, 146.3 J, 146.3 AC, 146.3 MA, 146.3 R; 360/129, 120, 121, 122; 235/61.11 E, 61.11 D

[56] References Cited
UNITED STATES PATENTS

| | | | |
|---|---|---|---|
| 3,104,369 | 9/1963 | Rabinow et al. | 340/146.3 AG |
| 3,104,381 | 9/1963 | Gottschalk et al. | 340/146.3 C |
| 3,146,422 | 8/1964 | Greanias et al. | 340/146.3 D |
| 3,195,119 | 7/1965 | Worosz | 360/129 |
| 3,348,201 | 10/1967 | Colburn et al. | 340/146.3 AG |
| 3,432,809 | 3/1969 | Reumerman et al. | 340/146.3 MA |
| 3,710,319 | 1/1973 | Miller et al. | 340/146.3 J |

*Primary Examiner*—Leo H. Boudreau
*Attorney, Agent, or Firm*—Richards, Harris and Medlock

[57] ABSTRACT

An improved magnetic image character reading system which produces high signal levels, eliminates dead spots between sample tracks for full resolution. Two sets of read heads are positioned in a spaced apart, staggered arrangement such that one set is adjacent the other with elements of the first set staggered to overlap the tracks read by the second set. Scanned signals generated while passing magnetized characters first past one set and then past the second set of heads are combined after delay of the signal generated by the first set of heads to compensate for spacing between the sets of heads.

6 Claims, 5 Drawing Figures

IMAGE CHARACTER READER SYSTEM

BACKGROUND OF THE INVENTION

1. Field of The Invention

This invention relates to automated reading of characters printed in magnetic ink, and more particularly to alphanumeric character detection by generating an X-Y array of signals from multi-element magnetic read heads spaced in relation to the direction of character movement with tracks of one head overlapping the tracks of another head.

2. Description of the Prior Art

Magnetic ink character recognition (MICR) systems are widely used for sensing information recorded on documents such as checks, credit card slips, and the like. Sensed information is converted into processable data form.

In one type of reader, a transport moves a document to be read containing alphanumeric characters imprinted in magnetic ink through a reading station. At this station, a device sensitive to the character being passed therethrough responds to the magnetized material. The response is in the form of an analog signal the waveform of which is unique to the particular character.

MICR readers employ a magnetic read head which generates an analog signal representing the first derivative of the magnetic field surrounding the character as a function of time. The analog signal is then processed by, for example, transforming the signal to a digitized output array. The data in this array is then compared with known signal arrays to identify the particular character read. A synchronizer or clock is utilized to interrupt the signal from the read head as a function of the space occupied by the character on the document. In this way, a discrete signal is generated which corresponds to a portion of magnetic field sensed during passage of a character over the head.

An improvement in MICR systems utilizes a multiple, linear array of read heads, one adjacent the other and placed perpendicular to the direction of movement of the character to be read. Such units read characters as a series of horizontal slices or tracks. The head reading on individual track responds to the magnetic field associated with the area of a given track. The response of each individual head may then be stored as a two-dimensional digitized signal matrix. By increasing the number of tracks, i.e., the number of heads, and by simultaneously decreasing the signal sample interval, the array may be expanded to provide higher resolution. Because of physical constraints, the total number of tracks into which a signal character may be subdivided is limited.

Despite this improvement, MICR systems still have significant shortcomings. Systems using known methods experience a reject rate of from about 3% to 7% of the documents. Rejects occur because of ink smudges, misalignment in printing of characters, improper ink densities and the like. The main problem is the dead space between elements in multi-element heads which misses signals centered between elements.

SUMMARY OF THE INVENTION

According to the invention, a dual multi-element magnetic read head is provided wherein at least two sets of magnetic read heads are spaced apart along spaced lines perpendicular to document movement. Preferably the read head tracks of one set of heads partially overlaps the tracks sensed by a second set of heads. Means are provided for scanning the signal outputs of the read heads and for delaying scanned signals from one set to compensate for document travel over the distance between the two sets of heads. Thereafter, the delayed signals are interlaced with the undelayed signals to produce a single signal train for analysis.

BRIEF DESCRIPTION OF THE DRAWINGS

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

DESCRIPTION OF THE PREFERRED EMBODIMENT

FIG. 1

Figure 1:
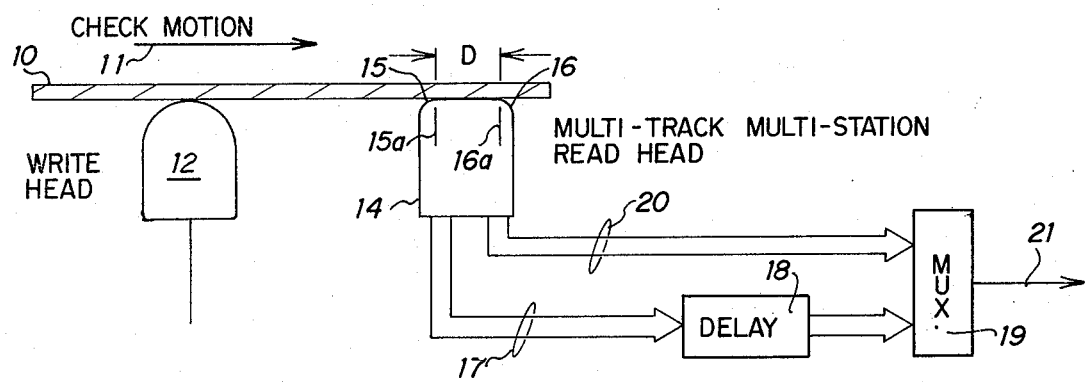
FIG. 1 is a diagrammatic representation of an embodiment of the invention.

FIG. 1 illustrates generally the system employed in the present invention wherein increased resolution is provided for reading characters imprinted in magnetic ink. Referring to FIG. 1, the document such as a check 10 is transported in the direction of arrow 11 in a generally well-known manner. It passes write head 12 and immediately passes over a multi-track, multi-head read unit 14. Unit 14 includes a first set of heads 15 centered along a line 15a and a second set of heads 16 centered along line 16a with the spacing D therebetween. The read head 15 forms a multi-element head with the tracks sensed by the elements thereof being staggered with respect to the track sensed by like elements in read head 16. Outputs from the elements in the head 15 are then applied by way of channels 17 to a delay unit 18. The output of delay unit 18 is applied to a multiplexer 19. Outputs from head 16 are applied by way of channel 20 to multiplexer 19. The delay unit 18 introduces a time delay in the signals from head 15 equal to the time required for the document to travel the distance D. In the multiplexer 19, the signals are then combined as a single train and appear on the output channel 21.

FIG. 2

Figure 2:
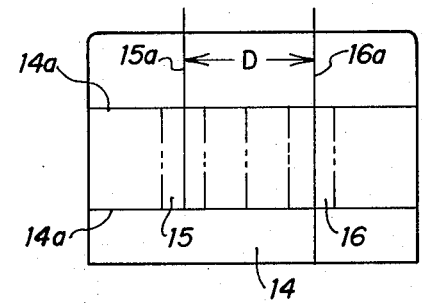
FIG. 2 is a front view of the dual read head of FIG. 1.

Referring to FIG. 2, the face of the unit 14 is shown with a central sensor zone 14a spanned by heads 15 and 16. The read head 15 is centered on line 15a and is spaced the distance D from the read head 16 which is centered on line 16a. In one embodiment, the width of the sensing zone 14a was 0.686 inch and provided for forty separate but partially overlapping tracks of magnetic data.

FIG. 3

Figure 3:
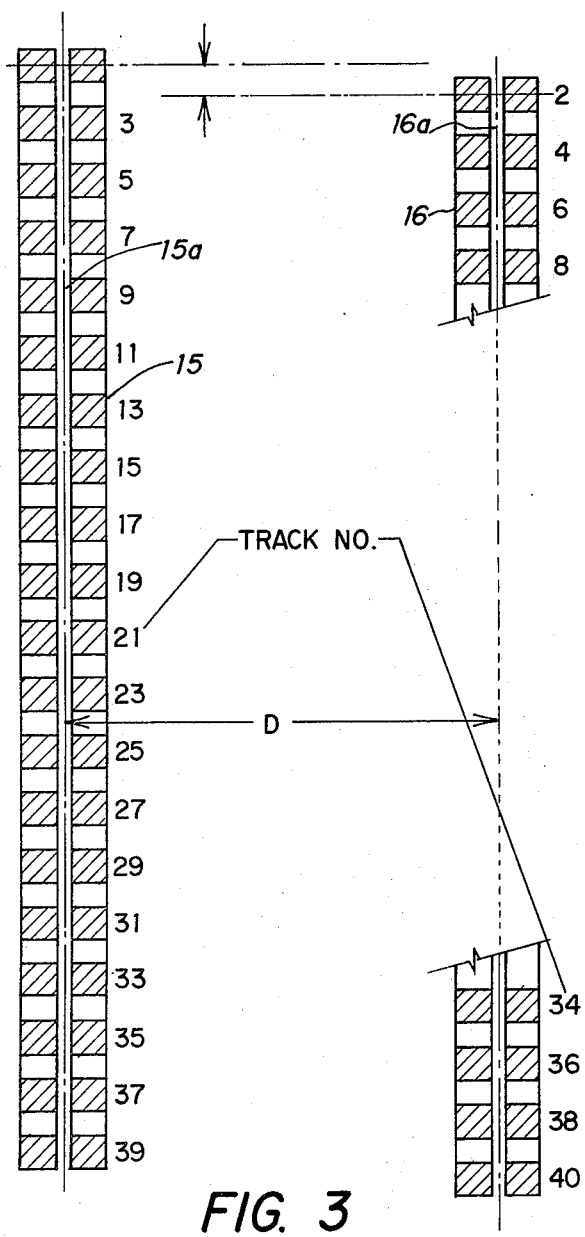
FIG. 3 is an enlarged view illustrating the relationship of the read heads of the unit of FIGS. 1 and 2.

More particularly, as shown in FIG. 3, read head 15 comprises odd numbered tracks 1–39. Read head 16 comprises even numbered tracks 2–40, the tracks being arranged serially from top to bottom. The sets of twenty tracks of the heads 15 and 16 each span a zone 0.686 inch wide in this embodiment.

FIG. 4

Figure 4:
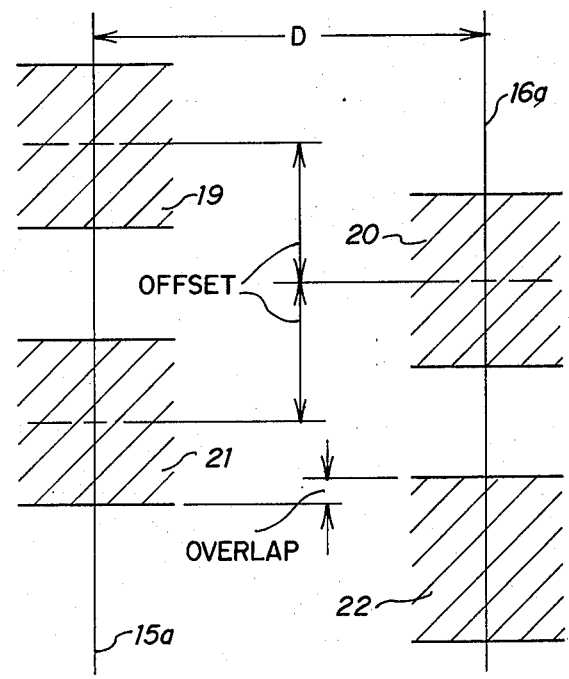
FIG. 4 illustrates a preferred embodiment showing overlap of the tracks read by the systems of FIGS. 1-3.

There is shown in FIG. 4, tracks of one head partially overlapping the tracks of the other head. For example, the fragmentary view of FIG. 4 shows tracks 19 and 21 of head 15 and tracks 20 and 22 of head 16. In this embodiment, the tracks 19 and 21 were spaced with their centers 0.035 inch apart. Each track width was 0.021 inch. This left a gap between adjacent tracks of 0.014 inch. Thus, track 20 overlaps track 19 by 0.0035 inch. Track 20 similarly overlaps track 21.

By using such a system, higher signal levels are promoted while eliminating the dead spaces between sample areas characteristic of prior systems. By this means, full resolution can be accomplished.

FIG. 5

Figure 5:
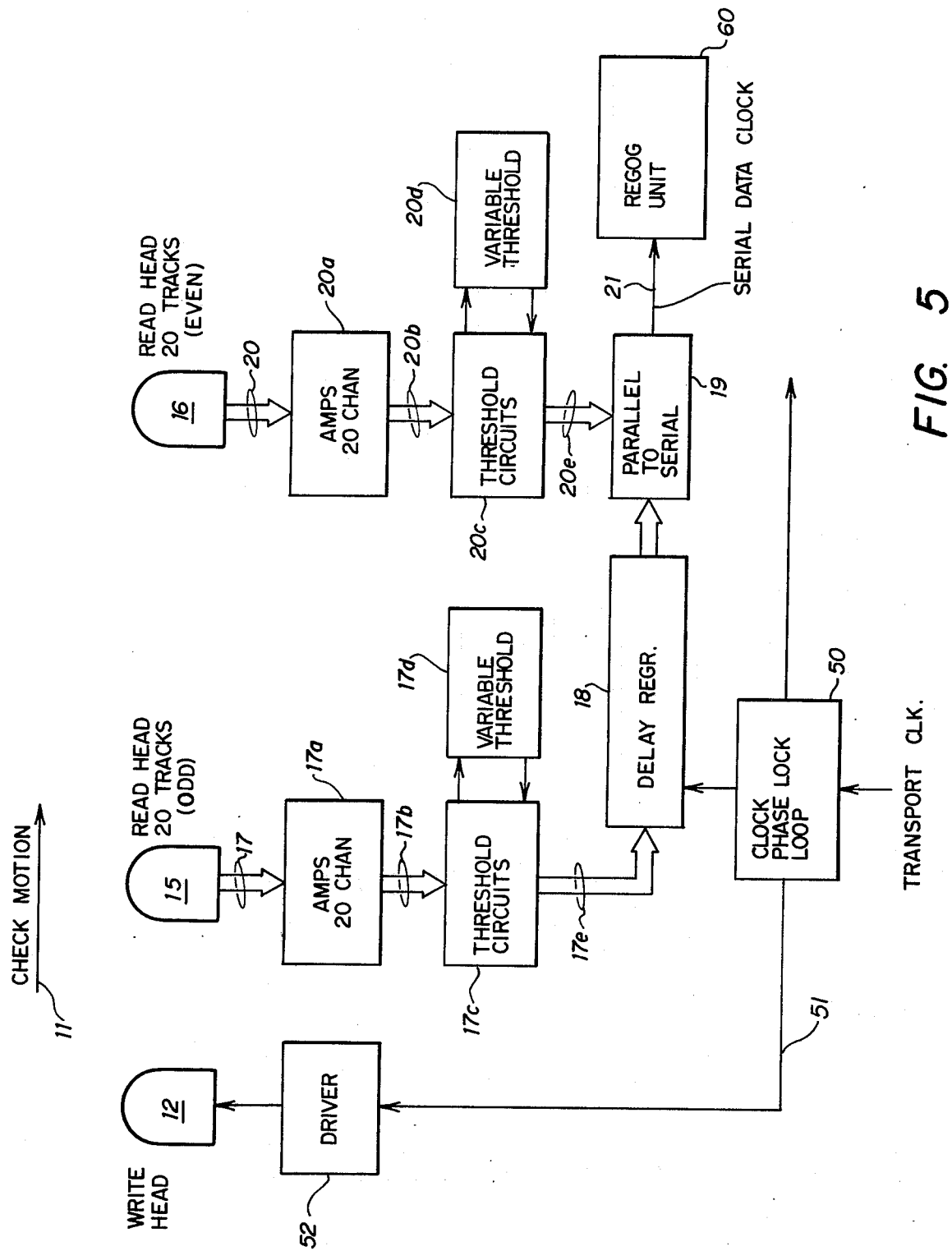
FIG. 5 is a block diagram of an embodiment of the invention.

The system is shown in block form in FIG. 5. The write head 12 and the multi-track read heads 15 and 16 are operated under the control of a clock phase lock loop unit 50 of well-known type such as described in Motorola, Inc. application note No. An-535 (1970) entitled "Phase-Locked Loop Design Fundamentals." Unit 50 applies a 30.8 kHz signal by way of channel 51 to a driver amplifier 52 to energize the write head 12. This serves to magnetize the magnetic ink materials on the check 10 of FIG. 1 as it approaches read heads 15 and 16.

Read head 15 has twenty elements connected by way of twenty channels 17 to a bank of twenty amplifier channels 17a, and thence by way of channels 17b to a like number of threshold circuits 17c which are operated under control of a variable threshold unit 17d. The output channels 17e then lead to delay register 18. Register 18 is an eighteen channel parallel delay register through which the outputs from the amplifiers 17a are clocked under control of the clock unit 50.

In a similar manner the multi-channel read head 16 is connected by way of channels 20 to a twenty unit bank of amplifiers 20a, and thence by way of channels 20b through a threshold circuit unit 20c.

In the embodiment herein described, the read heads 15 and 16 were spaced 0.832 inch apart, i.e., D = 0.832 inch. As before described, clock 50 provides a 30.8 kHz frequency to driver amplifier 52 to energize the write head 12. A 61.6 kHz frequency is applied, therefore, to the delay register 18 at every 0.0065 inch of document travel; thus requiring a twenty parallel channel delay of 128 bits per channel. Delay unit 18 preferably comprises ten units of the type manufactured and sold by Signetics, and identified as Model No. 2521 dual 128 bit shift register.

With the odd track signals delayed by register 18, the outputs of unit 18 and unit 20c may be merged by multiplexer 19 to produce a serial data stream on channel 21. The serial data stream may then be applied to a suitable recognition unit 60. While there are many suitable recognition units, one suitable form is of the type described in U.S. Pat. No. 3,717,848, assigned to the assignee of the present application. In such case, channel 21 of FIG. 5 would be effectively connected to the input to the two-dimensional storage matrix 16 of U.S. Pat. No. 3,717,848.

It will be appreciated that while FIG. 5 illustrates a system in which the signals are handled in parallel to the point that they are applied to channel 21, the system may be constructed to operate with serial data from the output of the read heads as they are scanned. In such case, a delay unit would be a single channel delay unit of length twenty times the length of the delay unit 18 shown in FIG. 5. The signals from such serial delay unit and from the threshold circuit 20c would then be interlaced bit for bit in producing the serial output stream on channel 21.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A reading system for sensing magnetic characters on a document transport past a read station which comprises:
   a. a first set of read head elements each of a selected dimension spaced laterally one from another less than the selected dimension across a path traversed by said document at said read station to sense magnetic material on a first set of spaced, parallel tracks,
   b. a second set of read head elements each of a selected dimension spaced laterally one from another less than the selected dimension across said path downstream from said first set in a partially overlapping relation with respect to said first set to sense magnetic material along parallel tracks intermediate and in part common to said first set of tracks, and having a center line offset from the center line of the next read head of said first set less than the selected dimension,
   c. means to delay signals from said first set, and
   d. means to combine signals from said second set and from said delay means.

2. A multi channel MICR reading system comprising:
   a. a first multi channel set of trandsucers, each channel including a plurality of read heads, each read head having a selected dimension and arrayed along a first line perpendicular to the direction of character movement and spaced one from another along the first line less than the selected dimension to sense spaced tracks in the direction of movement,
   b. a second multi channel set of transducers, each channel including a plurality of read heads, each read head having a selected dimension arrayed along a second line downstream from and parallel to the said first line and spaced one from another along the second line less than the selected dimension to overlap two read heads of the first set and positioned to sense spaced tracks in the direction of movement intermediate and partially overlapping the tracks sensed by said first set, each read head in said second multi channel set has a center line offset from the center line of the next nearest read head of said first set a distance less than the selected dimension,
   c. means to repeatedly scan both said sets in synchronism to produce successive pairs of groups of signals, one group for each scan of each said set,
   d. delay means to delay groups of signals from the upstream set of said transducers, and e. means to combine the signals from said delay means and from the downstream set of said transducers to produce a single train of output signals.

3. A magnetic character reading system including means for moving a document through a read station, comprising in combination:

sensing structure comprising:

a first set of read heads each of a selected dimension uniformly spaced less than the selected dimension laterally across a sensing zone in the read station along a first line perpendicular to the direction of movement of the document through the read station, and a second set of read heads each of the same selected dimension as the read heads of said first set and also uniformly spaced less than the selected dimension laterally across the sensing zone along a second line downstream from and parallel to the first line in an overlapping staggered relation to the read heads in said first set and having a center line offset from the center line of the next nearest read head of said first set less than the selected dimension, said first and second sets of read heads generating output signals, means for synchronously scanning the output signals from said two sets, means to delay signals from said first set a time interval representative of the travel time of a document from said first line to said second line, and means to combine signals from said second set with signals from said delay means.

4. The combination set forth in claim 3 in which each track sensed by heads in said first set is partially overlapped by tracks sensed by heads in said second set.

5. The combination set forth in claim 3 in which said first and second sets of read heads are mounted in a single support structure.

6. The combination set forth in claim 3 in which the read heads are of the order of 0.020 inch wide and are spaced with about 0.035 inch between centers thereof.

* * * * *